UNITED STATES PATENT OFFICE.

RUDOLF DORN, OF OMAHA, NEBRASKA.

HOG-CHOLERA REMEDY.

SPECIFICATION forming part of Letters Patent No. 265,770, dated October 10, 1882.

Application filed August 10, 1882. (No specimens.)

*To all whom it may concern:*

Be it known that I, RUDOLF DORN, of Omaha, in the State of Nebraska, have invented a new medicinal compound for the cure and prevention of hog-cholera, of which the following is a specification.

The ravages of cholera among hogs, as is well known, are very great, and the want of an efficient cure has long been felt. I have found by experience that my compound acts as a reliable preventive and cure for the disease.

The mixture is composed of the following ingredients, in or about the proportions designated: sulphate of iron, four ounces; Glauber's salt, four ounces; arsenic, two grains; carbolic acid, ten drops; hydrochloric acid, ten drops; tincture of opium, ten drops. The proportions above stated are preferred, and are believed to be the best; but they may be varied somewhat.

The compound is prepared by first carefully mixing the sulphate of iron, Glauber's salt, and arsenic, and then adding the carbolic acid, hydrochloric acid, and the tincture of opium, the whole being then thoroughly mixed.

The medicine is to be administered in the following manner: First, for the prevention of cholera, give one tea-spoonful every two days to each hog in slop or mash; second, for the cure of cholera, give one teaspoonful twice every day to each hog in a pint of sweet milk. This manner of giving the medicine is preferred by me; but it may be given differently and more or less frequently, according to the severity of the disease. The medicine may of course also be given to other animals.

I am aware that the several ingredients herein mentioned have been used for the treatment of hog-cholera, but in compounds differing from that herein claimed.

I claim as my invention—

The compound for the prevention and cure of cholera in animals, composed of sulphate of iron, Glauber's salt, arsenic, carbolic acid, hydrochloric acid, and tincture of opium, as set forth.

In testimony whereof I have hereunto subscribed my name.

RUDOLF DORN.

Witnesses:
EDMUND PEYCKE,
CHAS. E. BURMESTER.